United States Patent Office 3,285,154
Patented Nov. 15, 1966

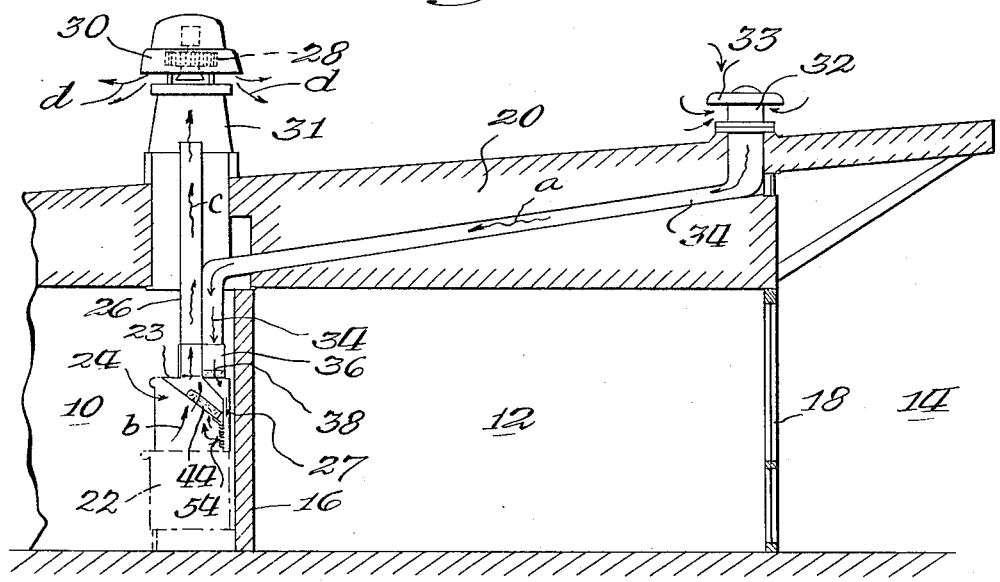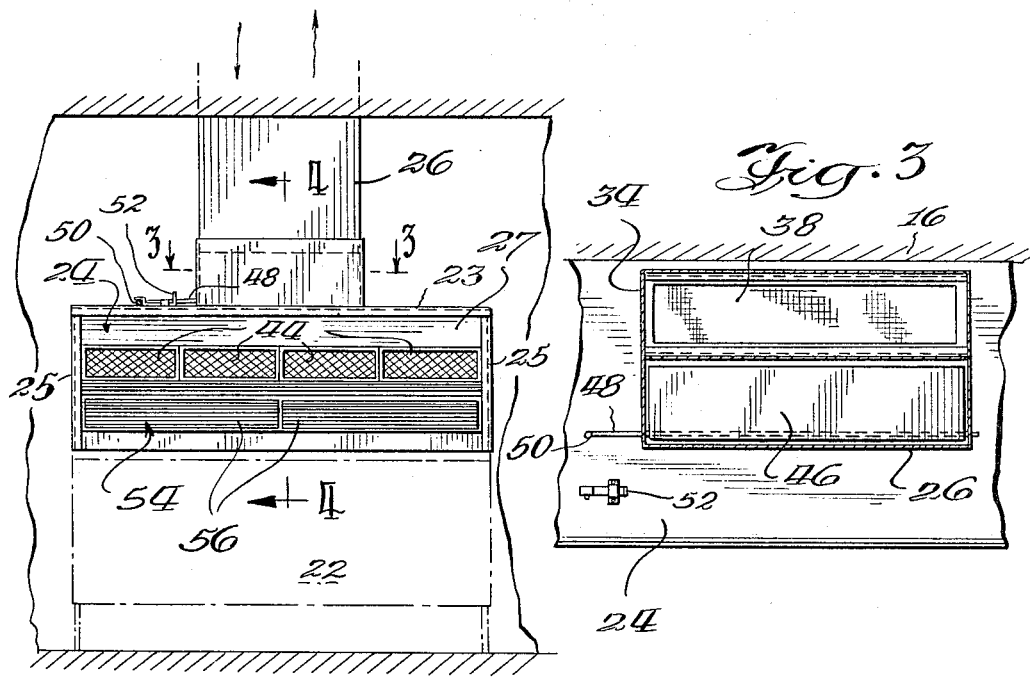

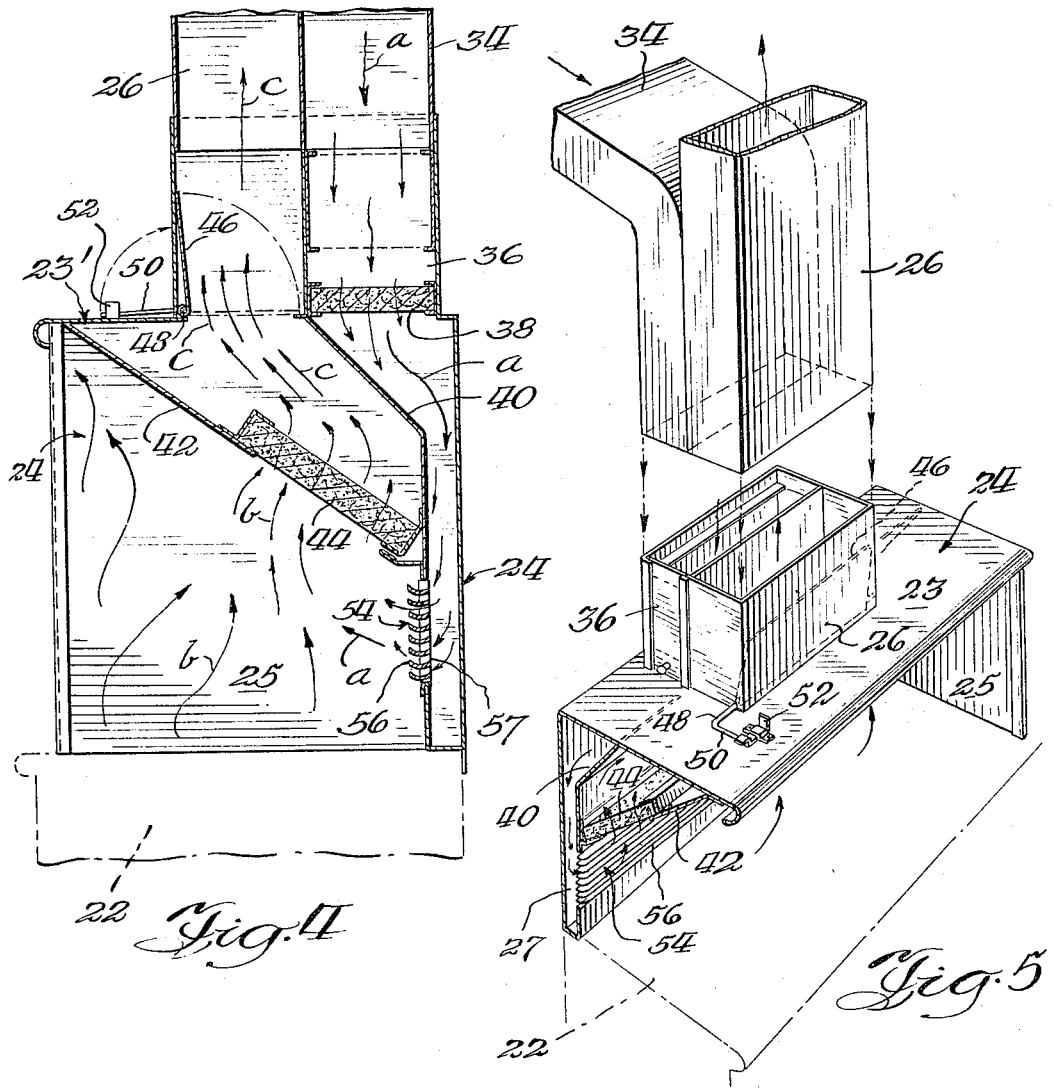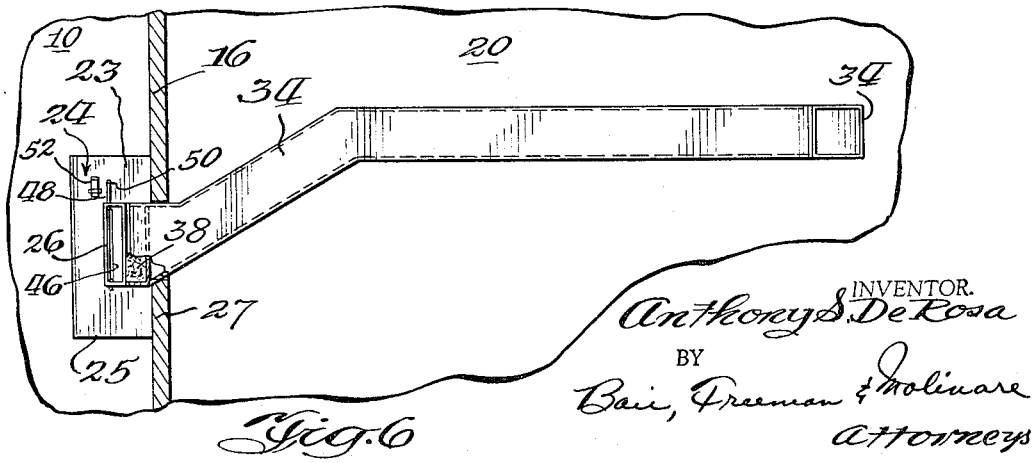

3,285,154
POSITIVE DIRECT RELIEF MEANS FOR
EXHAUST SYSTEMS
Anthony S. De Rosa, Oak Park, Ill., assignor to Henry's
Drive-In, Inc., Chicago, Ill., a corporation of Illinois
Filed Feb. 24, 1964, Ser. No. 346,949
1 Claim. (Cl. 98—115)

This invention relates to relief means for exhaust systems which is both positive and direct, and avoids the usual withdrawal of substantial quantities of room air from heated or air conditioned spaces.

One object of the invention is to provide a relief means for ventilating hoods of cooking units or the like which supplies exterior air to the ventilating hood, instead of the exhaust fan when withdrawing air and fumes from the ventilating hood drawing upon room air only and thereby lowering the efficiency of heating systems in the wintertime and air conditioning systems in the summertime due to negative pressure created within the kitchen or the like in which the cooking unit is located, my relief means thereby creating a more positive pressure condition within the kitchen.

Another object is to provide, in combination with the usual open-front ventilating hood for a cooking unit, a means to supply outside air to a ventilating hood of a cooking unit adjacent the back thereof and deflect it so that it passes over the grills, fryers and the like of the cooking unit to pick up fumes therefrom whereupon the mixture of fumes and supplied air passes directly to the exhaust duct and is discharged by the exhaust fan, with only a desired amount of the room air being drawn into the exhaust system.

A further object is to provide a roof ventilator and an intake duct leaving therefrom to the usual ventilating hood and exhaust system of a cooking unit to thereby supply outside air to the exhaust system along with the fumes from the cooking unit in order to minimize the withdrawal of room air.

A still further object of this invention is to locate the roof ventilator inlet a sufficient distance from the roof exhaust fan so as to avoid any short circuiting of the exhaust fumes into the intake air ventilator, regardless of any air currents or the climatic conditions outside the building.

Still a further object is to extend the intake duct through the building and adjacent the lower end of the exhaust duct to temper the air from the roof ventilator so that any air that enters the kitchen will not be so cold in the wintertime nor so hot in the summertime.

An additional object is to provide a suitable filter for the incoming supplied air, and one located within the ventilating hood for the air and fumes that pass into the exhaust duct leading to the exhaust fan.

With these and other objects in view, my invention consists in the construction, arrangement and combination of the various parts of my positive direct relief means for exhaust systems, whereby the objects above contemplated are attained, as hereinafter more fully set forth, pointed out in my claim and illustrated in detail on the accompanying drawings wherein:

FIG. 1 is a vertical sectional view (somewhat diagrammatic) through a building such as a drive-in unit showing my positive direct relief means applied to the exhaust system of the building;

FIG. 2 is a vertical elevation of the cooking unit and the ventilating hood thereover, and a portion of my system as viewed from the left side of FIG. 1;

FIG. 3 is a horizontal sectional view on the line 3—3 of FIG. 2;

FIG. 4 is an enlarged vertical sectional view on the line 4—4 of FIG. 3;

FIG. 5 is a perspective view of part of the system, and

FIG. 6 is a plan view of FIG. 1 to show certain duct relationships.

On the accompanying drawings, I have used the reference numeral 10 to indicate the kitchen area, 12 the sales area and 14 the service area of a drive-in unit. These areas are defined by a partition 16, a wall 18 and a roof 20, in general.

A cooking unit 22 is indicated which may comprise grills, fryers, toasters and the like of the usual type found in kitchen areas of drive-in units, restaurants, lunch rooms, etc. The usual ventilating hood 24 is associated therewith and comprises a top wall 23, side walls 25 and a back wall 27, the front thereof being open opposite the back wall 27 to the interior of the kitchen area for operational access to the cooking unit.

An exhaust duct 26 leads upwardly from the ventilating hood top 23 into a supporting structure 31 at the top of which is an exhaust fan 28 within an exhaust housing 30.

Heretofore, it has been customary to operate a ventilating hood such as shown at 24 solely by means of the exhaust duct 26 and the exhaust fan 28, which, while it gets rid of fumes from the cooking operations, draws in a considerable amount of room air from the kitchen 10 and causes a negative pressure condition therein. In mild weather when the kitchen requires neither heating nor cooling, there is no objection to such a system. However, when the kitchen 10 must be heated to maintain a comfortable working temperature therein, much of the heat can be lost through the duct 26 and the fan 28. Likewise, when air conditioning is in operation to lower the temperature in the kitchen 10 during the summertime, the efficiency of the air conditioning unit is impaired because of withdrawing cool air from the kitchen through the exhaust fan.

In order to minimize wasted heat during the heating season and inefficient air conditioning operation during the cooling season, it is desirable to minimize withdrawal of air from the room which can be accomplished by supplying air from the outside of the building. By providing a roof ventilator 32 and an intake duct 34 leading therefrom into the hood 24, such air can be directly supplied to the exhaust duct 26 instead of withdrawing air from the room during operation of the exhaust fan.

I show a roof ventilator comprising merely an intake end for the duct 34 which leads to a duct fitting 36 on the hood 24 for discharging outside air from the duct 34 into the hood. The roof ventilator may have a suitable cover 33 to prevent undesirable entrance of rain or snow. Within the hood, however, it is desirable to control the flow of the incoming air so that it passes over the cooking elements of the cooking unit and this I accomplish by means of a deflector 40 in the hood 24 as shown in FIG. 4 extending from side wall to side wall thereof and terminating above the cooking unit so that the air coming in as indicated by the arrows $a$ flows over the top of the cooking unit and mixes with the fumes $b$ rising from the cooking elements. Since the exhaust fan 28 is in operation, it withdraws the air and fumes upwardly as indicated by the arrows $c$.

Of course, some of the room air will find its way into the exhaust duct and this is desired, but the percentage is very small when the intake duct 34 is provided, as illustrated, to supply the greater percentage of the air being drawn into the exhaust duct. With the areas of the ducts 34 and 26 substantially equal, as shown in FIG. 3, slightly more air will be withdrawn through the exhaust duct than comes in through the intake duct which thereby causes some room air to be drawn in—a sufficient amount to insure that the fumes and odors from the cooking operations are withdrawn by the exhaust fan.

By having the intake duct 34 travel some distance within the building and downwardly along the exhaust duct 26, the indrawn air is tempered to further increase the efficiency of the relief means. The indrawn air then passes through a supply grille 54 which is aerodynamically constructed to control the proper flow and turbulence of the supplied air. Thus, as particularly illustrated in FIGURE 4, the grille 54 advantageously is formed with a plurality of arcuate louvers 56 which are shaped and oriented, being curved upwardly toward the exhaust filter 44, so as to provide the desired control for the air flow from the intake duct 34.

I provide a partition 42 in the hood 24 which has the exhaust filter 44 (or a plurality thereof as shown in FIG. 2) for the air passing to the exhaust duct. It is also desirable to have a filter 38 adjacent the hood 24 to filter the incoming air from the duct 34.

The exhaust duct 26 is provided with a damper 46 mounted on a damper rod 48 which in turn is pivotally mounted. The rod has a damper lever 50 which can be latched by means of a slide latch 52 as shown in FIG. 5 in position with the damper open as shown (also in FIG. 4). When the system is out of operation, the damper can be closed to prevent loss of room air by natural draft through the exhaust system.

Those skilled in the art will appreciate that, if desired, the damper 46 may be spring loaded in such a way that the damper will close automatically when the exhaust fan is off and the damper will open automatically when the exhaust fan is on due to the air pressure differential created thereby. Also, if desired, this same feature may be incorporated in the ventilating duct to cause it to be opened and closed automatically.

It also will be understood by those skilled in the art that the arrangement of the present invention permits the roof intake and ventilating fan to be positioned a proper distance away from the roof exhaust fan, preferably fifteen feet or more, so as to avoid having the exhaust fumes drawn into the intake air ventilator regardless of any currents or the climatic conditions outside the building. Such spacing of more than a minimum permissible distance is required by many sanitation codes and is illustrated in FIGS. 1 and 6 of the drawing.

The arrangement disclosed efficiently supplies air and thereby provides a positive direct relief means for the exhaust system as distinguished from a system which can withdraw only room air along with the fumes from the cooking unit. It is obvious that my disclosed relief means will effect a considerable economy in the operation of heating plants and air conditioning apparatus operating in conjunction with a kitchen or the like.

Some changes may be made in the construction and arrangement of the parts of my positive direct relief means for exahust systems without departing from the real spirit and purpose of my invention, and it is my intention to cover by my claim any modified forms of structure or use of mechanical equivalents which may reasonably be included within its scope.

I claim as my invention:

In a direct relief means for exhaust systems, the combination with a ventilating hood for a cooking unit or the like within a building, an exhaust duct leading therefrom to the exterior of the building and an exhaust fan for withdrawing air and fumes from said ventilating hood through said exhaust duct; of means for supplying air from the exterior of the building to said ventilating hood to be drawn into said exhaust duct along with fumes from said cooking unit, means to confine the discharge of the supplied air to a location between the top of the cooking unit and the air intake of said exhaust duct, said hood being open at its front only to the room in which the cooking unit is located for operational access to the cooking unit, the supplied air entering said hood adjacent the back thereof, and the air intake of said exhaust duct being at the top of said hood, said means for supplying air comprising a roof ventilator, an intake duct leading therefrom directly into said hood, and louver means at the discharge area of said intake duct to deflect the supplied air upwardly over the cooking unit and toward the air intake of said exhaust duct, said intake duct extending a substantial distance inside the building and having a portion separated from said exhaust duct by a heat conducting wall whereby the incoming air in said intake duct is tempered by the outgoing air in said exhaust duct.

References Cited by the Examiner

UNITED STATES PATENTS

| | | | |
|---|---|---|---|
| 2,664,808 | 1/1954 | Peterson | 98—115 |
| 2,868,108 | 1/1959 | Peterson | 98—115 |
| 2,874,627 | 2/1959 | Simmonds | 98—115 |
| 3,145,643 | 8/1964 | Strouth | 98—115 |

ROBERT A. O'LEARY, *Primary Examiner.*

JOHN F. O'CONNOR, *Examiner.*

M. A. ANTONAKAS, *Assistant Examiner.*